US011112296B2

(12) United States Patent
Camacho Cardenas

(10) Patent No.: US 11,112,296 B2
(45) Date of Patent: Sep. 7, 2021

(54) DOWNHOLE TOOL STRING WEIGHT MEASUREMENT AND SENSOR VALIDATION

(71) Applicant: Schlumberger Technology Corporation, Sugar Land, TX (US)

(72) Inventor: Alejandro Camacho Cardenas, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 96 days.

(21) Appl. No.: 16/382,676

(22) Filed: Apr. 12, 2019

(65) Prior Publication Data

US 2020/0326226 A1 Oct. 15, 2020

(51) Int. Cl.
| | | |
|---|---|---|
| G01G 19/14 | (2006.01) |
| E21B 19/02 | (2006.01) |
| E21B 19/08 | (2006.01) |
| E21B 47/00 | (2012.01) |
| E21B 19/06 | (2006.01) |
| E21B 19/00 | (2006.01) |
| E21B 3/02 | (2006.01) |

(52) U.S. Cl.
CPC .......... *G01G 19/14* (2013.01); *E21B 19/008* (2013.01); *E21B 19/06* (2013.01); *E21B 19/08* (2013.01); *E21B 47/00* (2013.01); *E21B 3/02* (2013.01)

(58) Field of Classification Search
CPC ......... G01G 19/14; E21B 19/02; E21B 19/08; E21B 19/083; E21B 19/084; E21B 19/086; E21B 19/087; E21B 19/089; E21B 19/09
See application file for complete search history.

(56) References Cited

U.S. PATENT DOCUMENTS

| | | | | |
|---|---|---|---|---|
| 2,274,339 A | * | 2/1942 | Loomis | .............................. 173/4 |
| 3,374,341 A | * | 3/1968 | Klotz | ....................... E21B 47/06 700/301 |
| 8,280,636 B2 | * | 10/2012 | Newman | ................. E21B 19/00 702/6 |
| 2017/0370203 A1 | * | 12/2017 | Hadi | ......................... E21B 4/02 |
| 2019/0012411 A1 | | 1/2019 | Camacho Cardenas | |
| 2019/0264545 A1 | | 8/2019 | Camacho Cardenas et al. | |

\* cited by examiner

*Primary Examiner* — Catherine Loikith

(57) ABSTRACT

Methods and systems for performing weigh measurement of a downhole tool string and validating accuracy of corresponding sensors. A method may include commencing operation of a processing device to control operations at an oil and gas wellsite. The processing device may then output a movement control command to a lifting device to cause a downhole tool string to move in accordance to the movement control command, receive an acceleration measurement of the downhole tool string, and determine a weight measurement of the downhole tool string based on the movement control command and the acceleration measurement.

18 Claims, 5 Drawing Sheets

DOWNHOLE TOOL STRING WEIGHT MEASUREMENT AND SENSOR VALIDATION

BACKGROUND OF THE DISCLOSURE

Wells are generally drilled into the ground or ocean bed to recover natural deposits of oil, gas, and other materials that are trapped in subterranean formations. Well construction operations (e.g., drilling operations) may be performed at a wellsite by a drilling system having various automated surface and subterranean equipment operating in a coordinated manner. For example, a drive mechanism, such as a top drive or rotary table located at a wellsite surface, can be utilized to rotate and advance a drill string into a subterranean formation to drill a wellbore. The drill string may include a plurality of drill pipes coupled together and terminating with a drill bit. Length of the drill string may be increased by adding additional drill pipes while depth of the wellbore increases. Drilling fluid may be pumped from the wellsite surface down through the drill string to the drill bit. The drilling fluid lubricates and cools the drill bit, and carries drill cuttings from the wellbore back to the wellsite surface. The drilling fluid returning to the surface may then be cleaned and again pumped through the drill string. The equipment of the drilling system may be grouped into various subsystems, wherein each subsystem performs a different operation controlled by a corresponding local and/or a remotely located controller.

The wellsite equipment is typically monitored and controlled from a control center located at the wellsite surface. A typical control center houses a control station operable to receive sensor measurements from various sensors associated with the wellsite equipment and permit monitoring of the wellsite equipment by the wellsite control station and/or by human wellsite operators. The wellsite equipment may then be automatically controlled by the wellsite control station or manually by the wellsite operator based on the sensor measurements. Because the various pieces of well site equipment often operate in a coordinated manner, accuracy of sensor measurements generated or facilitated by various sensors is vital to achieve safe and efficient operation of such equipment. Sensors can undergo physical changes, lose calibration, or fail over time, resulting in a slow drift in sensor measurements. An inaccurate sensor (e.g., weight sensor) may cause improper operation (e.g., failure in mechanization, failure in synchronization) not just of the piece of equipment comprising the sensor, but other equipment as well. Inaccurate sensor measurements (e.g., hook load measurement) can also cause improper decision making by the control station and/or wellsite operators. Furthermore, inaccurate sensor measurements can lead to loss of productivity, higher consumption of resources, and higher maintenance costs.

One way of ensuring accuracy of sensor measurements is to calibrate sensors on a regular basis. However, a typical calibration process involves removing the sensor from the associated piece of wellsite equipment and connecting the sensor to a testing device to be checked against a reference. Because knowledge that a sensor is out of calibration is acquired after calibration, calibration does not validate accuracy of sensor measurements while the sensor is installed in association with the equipment.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a system including an acceleration sensor and a processing device. The acceleration sensor is disposed in association with a piece of equipment at an oil and gas wellsite and facilitates determination of an acceleration measurement of a downhole tool string. The processing device includes a processor and a memory storing computer program code. The processing device outputs a movement control command to a lifting device to cause the downhole tool string to move in accordance to the movement control command, receives the acceleration measurement, and determines a weight measurement of the downhole tool string based on the movement control command and the acceleration measurement.

The present disclosure also introduces a method including commencing operation of a processing device to control operations at an oil and gas wellsite. The processing device outputs a movement control command to a lifting device to cause a downhole tool string to move in accordance to the movement control command, receives an acceleration measurement of the downhole tool string, and determines a weight measurement of the downhole tool string based on the movement control command and the acceleration measurement.

The present disclosure also introduces a method including commencing operation of a processing device to control operations at an oil and gas wellsite, in which the processing device outputs a current movement control command to a lifting device to cause a downhole tool string to move, receives a current acceleration measurement of the downhole tool string, compares the current movement control command and the current acceleration measurement to recorded past movement control commands and corresponding recorded past acceleration measurements, and determines a current weight measurement of the tool string to be equal to a recorded past weight measurement associated with closest recorded movement control command and corresponding recorded acceleration measurement.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
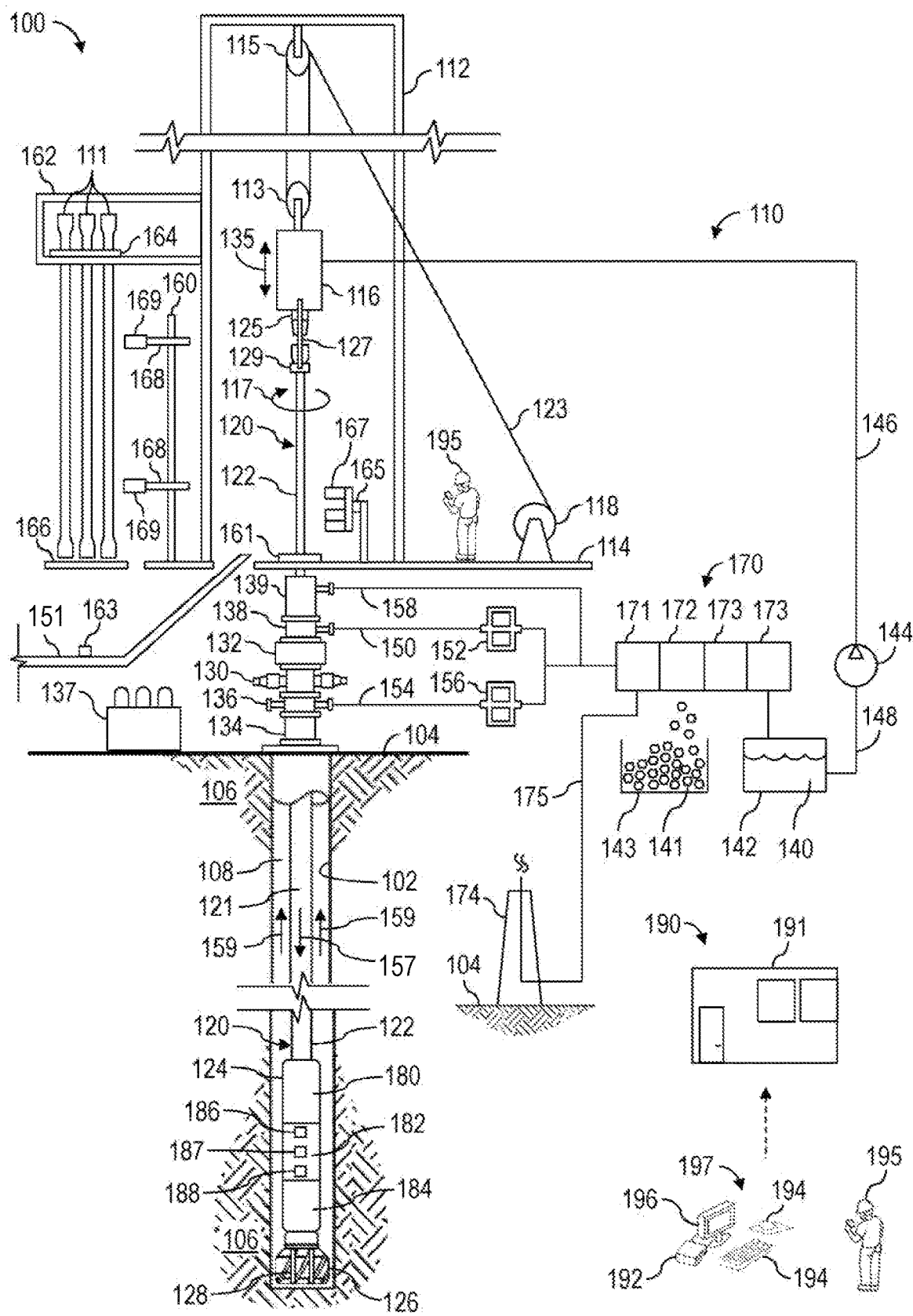
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

Systems and methods (e.g., processes, operations) according to one or more aspects of the present disclosure may be utilized or otherwise implemented in association with an automated well construction system at an oil and gas wellsite, such as for constructing a wellbore to obtain hydrocarbons (e.g., oil and/or gas) from a subterranean formation. However, one or more aspects of the present disclosure may be utilized or otherwise implemented in association with other automated systems in the oil and gas industry and other industries. For example, one or more aspects of the present disclosure may be implemented in association with wellsite systems for performing fracturing, cementing, acidizing, chemical injecting, and/or water jet cutting operations, among other examples. One or more aspects of the present disclosure may also be implemented in association with mining sites, building construction sites, and/or other work sites where automated machines or equipment are utilized.

FIG. 1 is a schematic view of at least a portion of an example implementation of a well construction system 100 according to one or more aspects of the present disclosure. The well construction system 100 represents an example environment in which one or more aspects of the present disclosure described below may be implemented. The well construction system 100 may be or comprise a drill rig and associated wellsite equipment. Although the well construction system 100 is depicted as an onshore implementation, the aspects described below are also applicable to offshore implementations.

The well construction system 100 is depicted in relation to a wellbore 102 formed by rotary and/or directional drilling from a wellsite surface 104 and extending into a subterranean formation 106. The well construction system 100 includes surface equipment 110 located at the wellsite surface 104 and a drill string 120 suspended within the wellbore 102. The surface equipment 110 may include a mast, a derrick, and/or another support structure 112 disposed over a rig floor 114. The drill string 120 may be suspended within the wellbore 102 from the support structure 112. The support structure 112 and the rig floor 114 are collectively supported over the wellbore 102 by legs and/or other support structures (not shown).

The drill string 120 may comprise a bottom-hole assembly (BHA) 124 and means 122 for conveying the BHA 124 within the wellbore 102. The conveyance means 122 may comprise drill pipe, heavy-weight drill pipe (HWDP), wired drill pipe (WDP), tough logging condition (TLC) pipe, coiled tubing, and/or other means for conveying the BHA 124 within the wellbore 102. A downhole end of the BHA 124 may include or be coupled to a drill bit 126. Rotation of the drill bit 126 and the weight of the drill string 120 collectively operate to form the wellbore 102. The drill bit 126 may be rotated from the wellsite surface 104 and/or via a downhole mud motor (not shown) connected with the drill bit 126. The BHA 124 may also include various downhole tools 180, 182, 184.

One or more of the downhole tools 180, 182, 184 may be or comprise an MWD or LWD tool comprising a sensor package 186 operable for the acquisition of measurement data pertaining to the BHA 124, the wellbore 102, and/or the formation 106. One or more of the downhole tools 180, 182, 184 and/or another portion of the BHA 124 may also comprise a telemetry device 187 operable for communication with the surface equipment 110, such as via mud-pulse telemetry. One or more of the downhole tools 180, 182, 184 and/or another portion of the BHA 124 may also comprise a downhole processing device 188 operable to receive, process, and/or store information received from the surface equipment 110, the sensor package 186, and/or other portions of the BHA 124. The processing device 188 may also store executable computer programs (e.g., program code instructions), including for implementing one or more aspects of the operations described herein.

The support structure 112 may support a driver, such as a top drive 116, operable to connect (perhaps indirectly) with an upper end of the drill string 120, and to impart rotary motion 117 and vertical motion 135 to the drill string 120, including the drill bit 126. However, another driver, such as a kelly and rotary table (neither shown), may be utilized instead of or in addition to the top drive 116 to impart the rotary motion 117 to the drill string 120. The top drive 116 and the connected drill string 120 may be suspended from the support structure 112 via a hoisting system or equipment, which may include a traveling block 113, a crown block 115, and a tubular lifting device, such as a draw works 118 storing a support cable or line 123. The crown block 115 may be connected to or otherwise supported by the support structure 112, and the traveling block 113 may be coupled with the top drive 116. The draw works 118 may be mounted on or otherwise supported by the rig floor 114. The crown block 115 and traveling block 113 comprise pulleys or sheaves around which the support line 123 is reeved to operatively connect the crown block 115, the traveling block 113, and the draw works 118 (and perhaps an anchor). The draw works 118 may thus selectively impart tension to the support line 123 to lift and lower the top drive 116, resulting in the vertical motion 135. The draw works 118 may comprise a drum, a base, and a prime mover (e.g., an engine or motor) (not shown) operable to drive the drum to rotate and reel in the support line 123, causing the traveling block 113 and the top drive 116 to move upward. The draw works 118 may be operable to reel out the support line 123 via a controlled rotation of the drum, causing the traveling block 113 and the top drive 116 to move downward.

The top drive 116 may comprise a grabber, a swivel (neither shown), elevator links 127 terminating with an elevator 129, and a drive shaft 125 operatively connected with a prime mover (not shown), such as via a gear box or transmission (not shown). The drive shaft 125 may be selectively coupled with the upper end of the drill string 120 and the prime mover may be selectively operated to rotate the drive shaft 125 and the drill string 120 coupled with the drive shaft 125. Hence, during drilling operations, the top drive 116, in conjunction with operation of the draw works 118, may advance the drill string 120 into the formation 106 to form the wellbore 102. The elevator links 127 and the elevator 129 of the top drive 116 may handle tubulars (e.g., drill pipes, drill collars, casing joints, etc.) that are not mechanically coupled to the drive shaft 125. For example, when the drill string 120 is being tripped into or out of the wellbore 102, the elevator 129 may grasp the tubulars of the drill string 120 such that the tubulars may be raised and/or lowered via the hoisting equipment mechanically coupled to the top drive 116. The grabber may include a clamp that clamps onto a tubular when making up and/or breaking out a connection of a tubular with the drive shaft 125. The top drive 116 may have a guide system (not shown), such as rollers that track up and down a guide rail on the support structure 112. The guide system may aid in keeping the top drive 116 aligned with the wellbore 102, and in preventing the top drive 116 from rotating during drilling by transferring reactive torque to the support structure 112.

The well construction system 100 may further include a well control system or equipment for maintaining well pressure control. For example, the drill string 120 may be conveyed within the wellbore 102 through various blowout preventer (BOP) equipment disposed at the wellsite surface 104 on top of the wellbore 102 and perhaps below the rig floor 114. The BOP equipment may be operable to control pressure within the wellbore 102 via a series of pressure barriers (e.g., rams) between the wellbore 102 and the wellsite surface 104. The BOP equipment may include a BOP stack 130, an annular preventer 132, and/or a rotating control device (RCD) 138 mounted above the annular preventer 132. The BOP equipment 130, 132, 138 may be mounted on top of a wellhead 134. The well control system may further include a BOP control unit 137 (i.e., a BOP closing unit) operatively connected with the BOP equipment 130, 132, 138 and operable to actuate, drive, operate or otherwise control the BOP equipment 130, 132, 138. The BOP control unit 137 may be or comprise a hydraulic fluid power unit fluidly connected with the BOP equipment 130, 132, 138 and selectively operable to hydraulically drive various portions (e.g., rams, valves, seals) of the BOP equipment 130, 132, 138.

The well construction system 100 may further include a drilling fluid circulation system or equipment operable to circulate fluids between the surface equipment 110 and the drill bit 126 during drilling and other operations. For example, the drilling fluid circulation system may be operable to inject a drilling fluid from the wellsite surface 104 into the wellbore 102 via an internal fluid passage 121 extending longitudinally through the drill string 120. The drilling fluid circulation system may comprise a pit, a tank, and/or other fluid container 142 holding the drilling fluid (i.e., mud) 140, and a pump 144 operable to move the drilling fluid 140 from the container 142 into the fluid passage 121 of the drill string 120 via a fluid conduit 146 extending from the pump 144 to the top drive 116 and an internal passage extending through the top drive 116. The fluid conduit 146 may comprise one or more of a pump discharge line, a stand pipe, a rotary hose, and a gooseneck connected with a fluid inlet of the top drive 116. The pump 144 and the container 142 may be fluidly connected by a fluid conduit 148, such as a suction line.

During drilling operations, the drilling fluid may continue to flow downhole through the internal passage 121 of the drill string 120, as indicated by directional arrow 157. The drilling fluid may exit the BHA 124 via ports 128 in the drill bit 126 and then circulate uphole through an annular space 108 ("annulus") of the wellbore 102 defined between an exterior of the drill string 120 and the wall of the wellbore 102, such flow being indicated by directional arrows 159. In this manner, the drilling fluid lubricates the drill bit 126 and carries formation cuttings uphole to the wellsite surface 104. The returning drilling fluid may exit the annulus 108 via a bell nipple 139, an RCD 138, and/or a ported adapter 136 (e.g., a spool, cross adapter, a wing valve, etc.) located below one or more portions of the BOP stack 130.

The drilling fluid exiting the annulus 108 via the bell nipple 139 may be directed toward drilling fluid reconditioning equipment 170 via a fluid conduit 158 (e.g., gravity return line) to be cleaned and/or reconditioned, as described below, prior to being returned to the container 142 for recirculation. The drilling fluid exiting the annulus 108 via the RCD 138 may be directed into a fluid conduit 150 (e.g., a drilling pressure control line), and may pass through various wellsite equipment fluidly connected along the conduit 150 prior to being returned to the container 142 for recirculation. For example, the drilling fluid may pass through a choke manifold 152 (e.g., a drilling pressure control choke manifold) and then through the drilling fluid reconditioning equipment 170. The choke manifold 152 may include at least one choke and a plurality of fluid valves (neither shown) collectively operable to control the flow through and out of the choke manifold 152. Backpressure may be applied to the annulus 108 by variably restricting flow of the drilling fluid or other fluids flowing through the choke manifold 152. The greater the restriction to flow through the choke manifold 152, the greater the backpressure applied to the annulus 108. The drilling fluid exiting the annulus 108 via the ported adapter 136 may be directed into a fluid conduit 154 (e.g., rig choke line), and may pass through various equipment fluidly connected along the conduit 154 prior to being returned to the container 142 for recirculation. For example, the drilling fluid may pass through a choke manifold 156 (e.g., a rig choke manifold, well control choke manifold) and then through the drilling fluid reconditioning equipment 170. The choke manifold 156 may include at least one choke and a plurality of fluid valves (neither shown) collectively operable to control the flow through the choke manifold 156. Backpressure may be applied to the annulus 108 by variably restricting flow of the drilling fluid or other fluids flowing through the choke manifold 156.

Before being returned to the container 142, the drilling fluid returning to the wellsite surface 104 may be cleaned and/or reconditioned via drilling fluid reconditioning equipment 170, which may include one or more of liquid gas separators 171, shale shakers 172, and other drilling fluid cleaning equipment 173. The liquid gas separators 171 may remove formation gasses entrained in the drilling fluid discharged from the wellbore 102 and the shale shakers 172 may separate and remove solid particles 141 (e.g., drill cuttings) from the drilling fluid. The drilling fluid reconditioning equipment 170 may further comprise other equipment 173 operable to remove additional gas and finer formation cuttings from the drilling fluid and/or modify physical properties or characteristics (e.g., rheology) of the drilling fluid. For example, the drilling fluid reconditioning equipment 170 may include a degasser, a desander, a desilter, a centrifuge, a mud cleaner, and/or a decanter, among other examples. Intermediate tanks/containers (not shown) may be utilized to hold the drilling fluid while the drilling fluid progresses through the various stages or portions 171, 172, 173 of the drilling fluid reconditioning equipment 170. The cleaned/reconditioned drilling fluid may be transferred to the fluid container 142, the solid particles 141 removed from the drilling fluid may be transferred to a solids container 143 (e.g., a reserve pit), and/or the removed gas may be transferred to a flare stack 174 via a conduit 175 (e.g., a flare line) to be burned or to a container (not shown) for storage and removal from the wellsite.

The surface equipment 110 may include a tubular handling system or equipment operable to store, move, connect, and disconnect tubulars (e.g., drill pipes) to assemble and disassemble the conveyance means 122 of the drill string 120 during drilling operations. For example, a catwalk 151 may be utilized to convey tubulars from a ground level, such as along the wellsite surface 104, to the rig floor 114, permitting the elevator 129 to grab and lift the tubulars above the wellbore 102 for connection with previously deployed tubulars. The catwalk 151 may have a horizontal portion and an inclined portion that extends between the horizontal portion and the rig floor 114. The catwalk 151 may comprise a skate 163 movable along a groove (not shown) extending longitudinally along the horizontal and inclined portions of the catwalk 151. The skate 163 may be operable to convey (e.g., push) the tubulars along the catwalk 151 to the rig floor 114. The skate 163 may be driven along the groove by a drive system (not shown), such as a pulley system or a hydraulic system. Additionally, one or more racks (not shown) may adjoin the horizontal portion of the catwalk 151. The racks may have a spinner unit for transferring tubulars to the groove of the catwalk 151.

An iron roughneck 165 may be positioned on the rig floor 114. The iron roughneck 165 may comprise a torqueing portion 167, such as may include a spinner and a torque wrench comprising a lower tong and an upper tong. The torqueing portion 167 of the iron roughneck 165 may be moveable toward and at least partially around the drill string 120, such as may permit the iron roughneck 165 to make up and break out connections of the drill string 120. The torqueing portion 167 may also be moveable away from the drill string 120, such as may permit the iron roughneck 165 to move clear of the drill string 120 during drilling operations. The spinner of the iron roughneck 165 may be utilized to apply low torque to make up and break out threaded connections between tubulars of the drill string 120, and the torque wrench may be utilized to apply a higher torque to tighten and loosen the threaded connections.

A set of slips 161 may be located on the rig floor 114, such as may accommodate therethrough the drill string 120 during tubular make up and break out operations and during the drilling operations. The slips 161 may be in an open position during drilling operations to permit advancement of the drill string 120, and in a closed position to clamp the upper end (e.g., uppermost tubular) of the drill string 120 to thereby suspend and prevent advancement of the drill string 120 within the wellbore 102, such as during the make up and break out operations.

During drilling operations, the hoisting system lowers the drill string 120 while the top drive 116 rotates the drill string 120 to advance the drill string 120 downward within the wellbore 102 and into the formation 106. During the advancement of the drill string 120, the slips 161 are in an open position, and the iron roughneck 165 is moved away or is otherwise clear of the drill string 120. When the upper end of the drill string 120 (i.e., upper end of the uppermost tubular of the drill string 120) connected to the drive shaft 125 is near the slips 161 and/or the rig floor 114, the top drive 116 ceases rotating and the slips 161 close to clamp the upper end of the drill string 120. The grabber of the top drive 116 then clamps the uppermost tubular connected to the drive shaft 125, and the drive shaft 125 rotates in a direction reverse from the drilling rotation to break out the connection between the drive shaft 125 and the uppermost tubular. The grabber of the top drive 116 may then release the uppermost tubular.

Multiple tubulars may be loaded on the rack of the catwalk 151 and individual tubulars may be transferred from the rack to the groove in the catwalk 151, such as by the spinner unit. The tubular positioned in the groove may be conveyed along the groove by the skate 163 until the box end of the tubular projects above the rig floor 114. The elevator 129 of the top drive 116 may then grasp the protruding box end, and the draw works 118 may be operated to lift the top drive 116, the elevator 129, and the new tubular.

The hoisting system then raises the top drive 116, the elevator 129, and the new tubular until the tubular is aligned with the upper portion of the drill string 120 clamped by the slips 161. The iron roughneck 165 is moved toward the drill string 120, and the lower tong of the torqueing portion 167 clamps onto the upper end of the drill string 120. The spinning system threadedly connects the lower end (i.e., pin end) of the new tubular with the upper end (i.e., box end) of the drill string 120. The upper tong then clamps onto the new tubular and rotates with high torque to complete making up the connection with the drill string 120. In this manner, the new tubular becomes part of the drill string 120. The iron roughneck 165 then releases and moves clear of the drill string 120.

The grabber of the top drive 116 may then clamp onto the drill string 120. The drive shaft 125 is brought into contact with the upper end of the drill string 120 (e.g., the box end of the uppermost tubular) and rotated to make up a connection between the drill string 120 and the drive shaft 125. The grabber then releases the drill string 120, and the slips 161 are moved to the open position. The drilling operations may then resume.

The tubular handling system may further include a pipe handling manipulator (PHM) 160 disposed in association with a vertical pipe rack 162 for storing tubulars 111 (or stands of two or three tubulars). The vertical pipe rack 162 may comprise or support a fingerboard 164 defining a plurality of slots configured to support or otherwise hold the tubulars 111 within or above a setback platform or area 166 located adjacent to, above, or below the rig floor 114. The vertical pipe rack 162 may be connected with and supported by the support structure 112 or another portion of the well construction system 100. The fingerboard 164/setback 166 provide storage (e.g., temporary storage) of tubulars 111 during various operations, such as during and between tripping out and tripping in the drill string 120. The PHM 160 may be operable to transfer the tubulars 111 between the fingerboard 164/setback 166 and the drill string 120 (i.e., space above the suspended drill string 120). For example, the PHM 160 may include arms 168 terminating with clamps 169, such as may be operable to grasp and/or clamp onto one of the tubulars 111. The arms 168 of the PHM 160 may extend and retract, and/or at least a portion of the PHM 160 may be rotatable and/or movable toward and away from the drill string 120, such as may permit the PHM 160 to transfer the tubular 111 between the fingerboard 164/setback 166 and the drill string 120.

To trip out the drill string 120, the top drive 116 is raised, the slips 161 are closed around the drill string 120, and the elevator 129 is closed around the drill string 120. The grabber of the top drive 116 clamps the upper end of a tubular of the drill string 120 coupled to the drive shaft 125. The drive shaft 125 then rotates in a direction reverse from the drilling rotation to break out the connection between the drive shaft 125 and the drill string 120. The grabber of the top drive 116 then releases the tubular of the drill string 120, and the drill string 120 is suspended by (at least in part) the elevator 129. The iron roughneck 165 is moved toward the drill string 120. The lower tong clamps onto a lower tubular below a connection of the drill string 120, and the upper tong clamps onto an upper tubular above that connection. The upper tong then rotates the upper tubular to provide a high torque to break out the connection between the upper and lower tubulars. The spinning system then rotates the upper tubular to separate the upper and lower tubulars, such that the upper tubular is suspended above the rig floor 114 by the elevator 129. The iron roughneck 165 then releases the drill string 120 and moves clear of the drill string 120.

The PHM 160 may then move toward the drill string 120 to grasp the tubular suspended from the elevator 129. The elevator 129 then opens to release the tubular. The PHM 160 then moves away from the drill string 120 while grasping the tubular with the clamps 169, places the tubular in the fingerboard 164/setback 166, and releases the tubular for storage. This process is repeated until the intended length of drill string 120 is removed from the wellbore 102.

The surface equipment 110 of the well construction system 100 may also comprise a control center 190 from which various portions of the well construction system 100, such as the top drive 116, the hoisting system, the tubular handling system, the drilling fluid circulation system, the well control system, the BHA 124, among other examples, may be monitored and controlled. The control center 190 may be located on the rig floor 114 or another location of the well construction system 100, such as the wellsite surface 104. The control center 190 may comprise a facility 191 (e.g., a room, a cabin, a trailer, etc.) containing a control workstation 197, which may be operated by a human wellsite operator 195 to monitor and control various wellsite equipment or portions of the well construction system 100. The control workstation 197 may comprise or be communicatively connected with a processing device 192 (e.g., a controller, a computer, etc.), such as may be operable to receive, process, and output information to monitor operations of and provide control to one or more portions of the well construction system 100. For example, the processing device 192 may be communicatively connected with the various surface and downhole equipment described herein, and may be operable to receive signals from and transmit signals to such equipment to perform various operations described herein. The processing device 192 may store executable program code, instructions, and/or operational parameters or set-points, including for implementing one or more aspects of methods and operations described herein. The processing device 192 may be located within and/or outside of the facility 191.

The control workstation 197 may be operable for entering or otherwise communicating control commands to the processing device 192 by the wellsite operator 195, and for displaying or otherwise communicating information from the processing device 192 to the wellsite operator 195. The control workstation 197 may comprise a plurality of human-machine interface (HMI) devices, including one or more input devices 194 (e.g., a keyboard, a mouse, a joystick, a touchscreen, etc.) and one or more output devices 196 (e.g., a video monitor, a touchscreen, a printer, audio speakers, etc.). Communication between the processing device 192, the input and output devices 194, 196, and the various wellsite equipment may be via wired and/or wireless communication means. However, for clarity and ease of understanding, such communication means are not depicted, and a person having ordinary skill in the art will appreciate that such communication means are within the scope of the present disclosure.

Well construction systems within the scope of the present disclosure may include more or fewer components than as described above and depicted in FIG. 1. Additionally, various equipment and/or subsystems of the well construction system 100 shown in FIG. 1 may include more or fewer components than as described above and depicted in FIG. 1. For example, various engines, motors, hydraulics, actuators, valves, and/or other components not explicitly described herein may be included in the well construction system 100, and are within the scope of the present disclosure.

Figure 2:
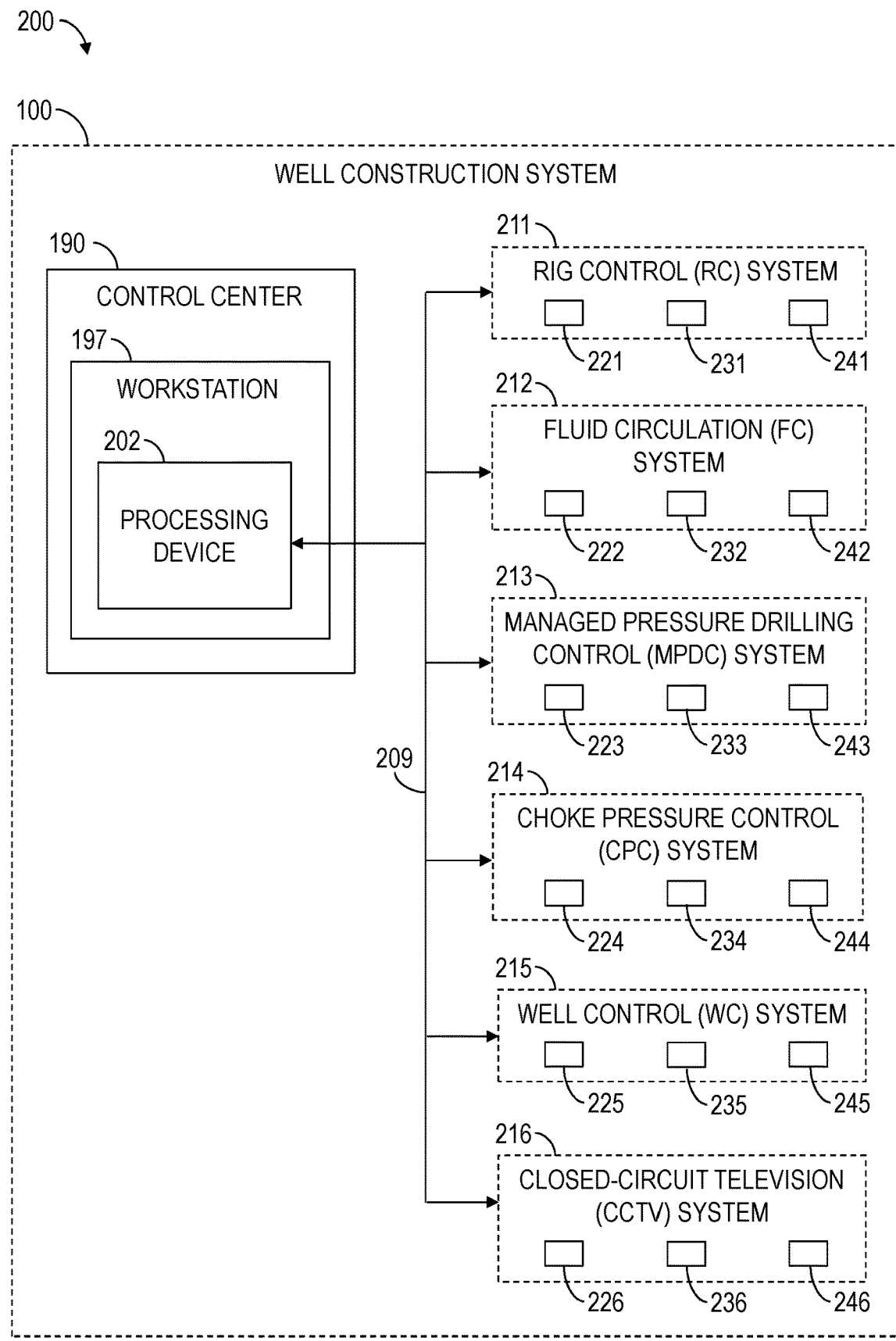
FIG. 2 is a schematic view of at least a portion of an example implementation of apparatus according to one or more aspects of the present disclosure.

The present disclosure further provides various implementations of systems and/or methods for controlling one or more portions of the well construction system 100. FIG. 2 is a schematic view of at least a portion of an example implementation of a monitoring and control system 200 for monitoring and controlling various equipment, portions, and subsystems of the well construction system 100 according to one or more aspects of the present disclosure. The following description refers to FIGS. 1 and 2, collectively.

The control system 200 may be in real-time communication with and utilized to monitor and/or control various portions, components, and equipment of the well construction system 100 described herein. The equipment of the well construction system 100 may be grouped into several subsystems, each operable to perform a corresponding operation and/or a portion of the well construction operations described herein. The subsystems may include a rig control (RC) system 211, a fluid circulation (FC) system 212, a managed pressure drilling control (MPDC) system 213, a choke pressure control (CPC) system 214, a well pressure control (WC) system 215, and a closed-circuit television (CCTV) system 216. The control workstation 197 may be utilized to monitor, configure, control, and/or otherwise operate one or more of the well construction subsystems 211-216.

The RC system 211 may include the support structure 112, the tubular lifting device or system (e.g., the draw works 118), drill string rotational system (e.g., the top drive 116 and/or the rotary table and kelly), the slips 161, the tubular handling system or equipment (e.g., the catwalk 151, the PHM 160, the setback 166, and the iron roughneck 165), electrical generators, and other equipment. Accordingly, the RC system 211 may perform power generation controls and drill pipe handling, hoisting, and rotation operations. The RC system 211 may also serve as a support platform for drilling equipment and staging ground for rig operations, such as connection make up and break out operations described above. The FC system 212 may include the drilling fluid 140, the pumps 144, drilling fluid loading equipment, the drilling fluid reconditioning equipment 170, the flare stack 174, and/or other fluid control equipment. Accordingly, the FC system 212 may perform fluid operations of the well construction system 100. The MPDC system 213 may include the RCD 138, the choke manifold 152, downhole pressure sensors 186, and/or other equipment. The CPC system 214 may comprise the choke manifold 156, and/or other equipment, and the WC system 215 may comprise the BOP equipment 130, 132, 138, the BOP control unit 137, and a BOP control station (not shown) for controlling the BOP control unit 137. The CCTV system 216 may include the video cameras (not shown) and corresponding actuators (e.g., motors) for moving or otherwise controlling direction of the video cameras. The CCTV system 216 may be utilized to capture real-time video of various portions or subsystems 211-215 of the well construction system 100 and display video signals from the video cameras on the video output devices 196 to display in real-time the various portions or subsystems 211-215. Each of the well construction subsystems 211-216 may further comprise various communication equipment (e.g., modems, network interface cards, etc.) and communication conductors (e.g., cables), communicatively connecting the equipment (e.g., sensors and actuators) of each subsystem 211-216 with the control workstation 197 and/or other equipment. Although the wellsite equipment listed above and shown in FIG. 1 is associated with certain wellsite subsystems 211-216, such associations are merely examples that are not intended to limit or prevent such wellsite equipment from being associated with two or more wellsite subsystems 211-216 and/or different wellsite subsystems 211-216.

The control system 200 may also include various local controllers 221-226 associated with corresponding subsystems 211-216 and/or individual pieces of equipment of the well construction system 100. As described above, each well construction subsystem 211-216 includes various wellsite equipment comprising corresponding actuators 241-246 for performing operations of the well construction system 100. Each subsystem 211-216 further includes various sensors 231-236 operable to generate sensor data indicative of operational performance and/or status of the wellsite equipment of each subsystem 211-216. Although the sensors 231-236 and actuators 241-246 are each shown as a single block, it is to be understood that each sensor 231-236 and actuator 241-246 may be or comprise a plurality of sensors and actuators, whereby each actuator performs a corresponding action of a piece of equipment or subsystem 211-216 and each sensor generates corresponding sensor data indicative of the action performed by a corresponding actuator or of other operational parameter of the piece of equipment or subsystem 211-216.

The local controllers 221-226, the sensors 231-236, and the actuators 241-246 may be communicatively connected with a processing device 202. For example, the local controllers 221-226 may be in communication with the sensors 231-236 and actuators 241-246 of the corresponding subsystems 211-216 via local communication networks (e.g., field buses, not shown) and the processing device 202 may be in communication with the subsystems 211-216 via a communication network 209 (e.g., data bus, a wide-area-network (WAN), a local-area-network (LAN), etc.). The sensor data (e.g., electronic signals, information, and/or measurements, etc.) generated by the sensors 231-236 of the subsystems 211-216 may be made available for use by processing device 202 and/or the local controllers 221-226. Similarly, control commands (e.g., signals, information, etc.) generated by the processing device 202 and/or the local controllers 221-226 may be automatically communicated to the various actuators 241-246 of the subsystems 211-216, perhaps pursuant to predetermined programming, such as to facilitate well construction operations and/or other operations described herein. The processing device 202 may be or comprise the processing device 192 shown in FIG. 1. Accordingly, the processing device 202 may be communicatively connected with or form a portion of the workstation 197 and/or may be at least partially located within the control center 190.

The sensors 231-236 and actuators 241-246 may be monitored and/or controlled by the processing device 202. For example, the processing device 202 may be operable to receive the sensor data from the sensors 231-236 of the wellsite subsystems 211-216 in real-time, and to provide real-time control commands to the actuators 241-246 of the subsystems 211-216 based on the received sensor data. However, certain operations of the actuators 241-246 may be controlled by the local controllers 221-226, which may control the actuators 241-246 based on sensor data received from the sensors 231-236 and/or based on control commands received from the processing device 202.

The processing devices 188, 192, 202, the local controllers 221-226, and other controllers or processing devices of the well construction system 100 may be operable to receive program code instructions and/or sensor data from sensors (e.g., sensors 231-236), process such information, and/or generate control commands (i.e., control signals or information) to operate controllable equipment (e.g., actuators 241-246) of the well construction system 100. Accordingly, the processing devices 188, 192, 202, the local controllers 221-226, and other controllers or processing devices of the well construction system 100 may individually or collectively be referred to hereinafter as equipment controllers. Equipment controllers within the scope of the present disclosure can include, for example, programmable logic controllers (PLCs), industrial computers (IPCs), personal computers (PCs), soft PLCs, variable frequency drives (VFDs) and/or other controllers or processing devices operable to receive sensor data and/or control commands and cause operation of controllable equipment based on such sensor data and/or control commands.

The various pieces of wellsite equipment described above and shown in FIGS. 1 and 2 may each comprise one or more hydraulic and/or electrical actuators, which when actuated, may cause corresponding components or portions of the piece of equipment to perform intended actions (e.g., work, tasks, movements, operations, etc.). Each piece of equipment may further comprise a plurality of sensors, whereby one or more sensors may be associated with a corresponding actuator or another component of the piece of equipment and communicatively connected with an equipment controller. Each sensor may be operable to generate sensor data (e.g., electrical sensor signals or measurements) indicative of an operational (e.g., mechanical, physical) status of the corresponding actuator or component, thereby permitting the operational status of the actuator to be monitored by the equipment controller. The sensor data may be utilized by the equipment controller as feedback data, permitting operational control of the piece of equipment and coordination with other equipment. Such sensor data may be indicative of performance of each individual actuator and, collectively, of the entire piece of wellsite equipment.

The present disclosure is further directed to systems and processes for determining sensor measurements and validating or otherwise determining accuracy (i.e., quality) of such sensor measurements in real-time while the sensors are utilized in the field (e.g., at an oil and gas wellsite). Determining sensor measurements may include deducing (e.g., interpolating, comparing) such sensor measurements based on control commands (i.e., control signals or information) and sensor measurements (i.e., signals or information) indicative of actions (e.g., movements, physical operations) and/or other operational parameters (e.g., pressure, temperature, weight, etc.) that are caused by such control commands. Thus, determining sensor measurements may include deducing sensor measurements based on control commands and other sensor measurements caused by such control commands. Accuracy of the deduced sensor measurements may be determined by comparing such deduced sensor measurements to detected (e.g., actually measured by a sensor) sensor measurements. Relative differences or changes between the deduced sensor measurements and the detected sensor measurements may then be established and/or analyzed based on such comparisons, thereby permitting one or both of the deduced sensor measurements and the detected sensor measurements to be determined (e.g., validated, confirmed, deemed) as accurate within a certain degree of confidence. The deduced sensor measurements and the detected sensor measurements may be indicative of corresponding operational parameters (e.g., position, distance, speed, acceleration, weight, force, pressure, event status, etc.) performed or caused by automated equipment. The deduced sensor measurements, the detected sensor measurements, and the operational parameters may be related to each other through context of common or related equipment and/or operations.

Accuracy of sensor measurements may be determined in real-time during wellsite operations by a wellsite monitoring and control system, such as the control system 200, communicatively connected with or otherwise operable to receive and compare or otherwise analyze the deduced sensor measurements and/or detected sensor measurements. The control system may help identify anomalies among the sensor measurements during early stages before the sensor measurements degrade further. The control system may compensate for the identified anomalies thereby improving the quality of the deduced and detected sensor measurements, both for real-time use during wellsite operations and for post collection data analysis. The control system may also facilitate improved management of sensors and their state of health.

Figure 3:
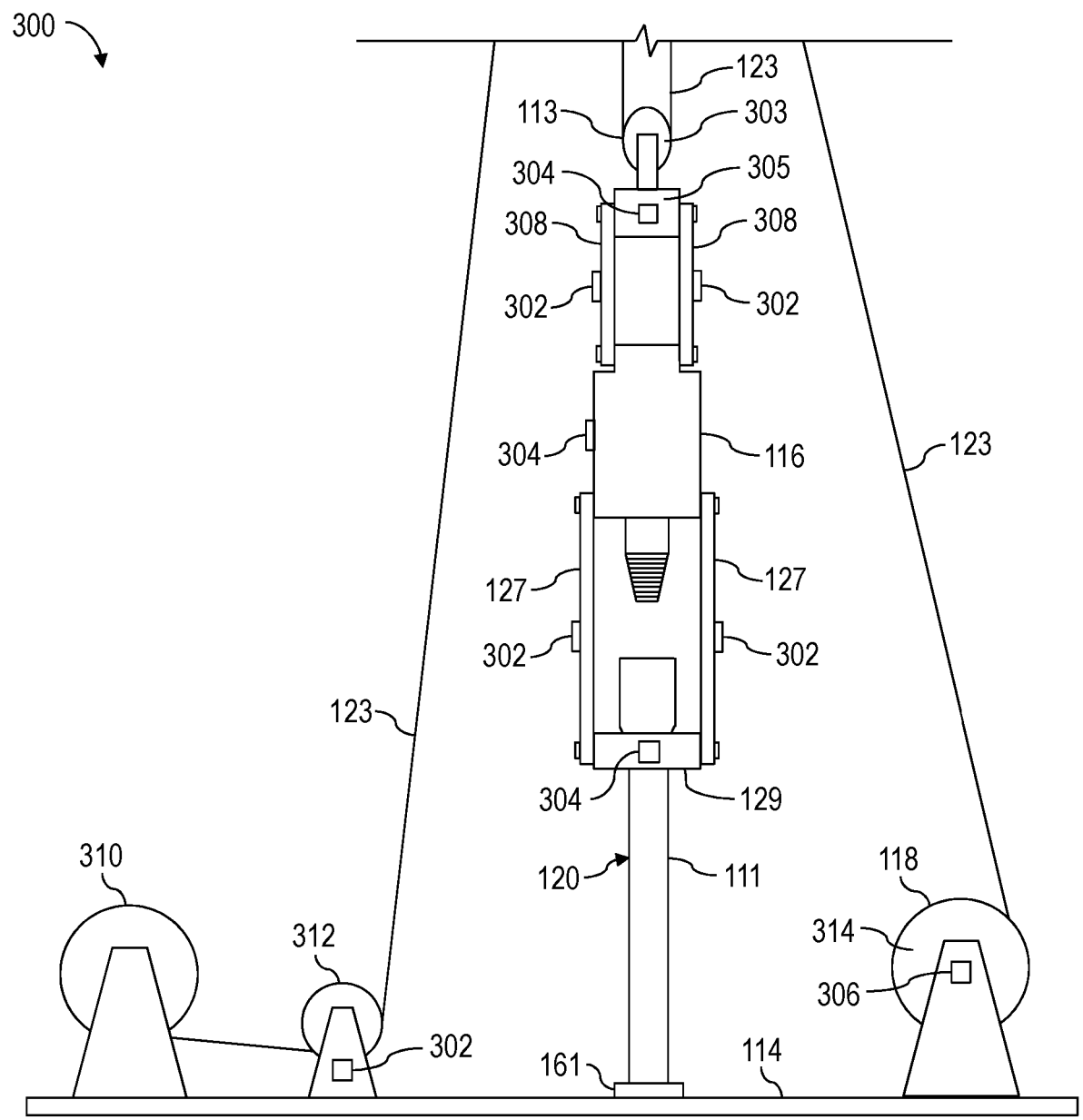
FIG. 3 is a schematic view of at least a portion of an example implementation of apparatus according to one or more aspects of the present disclosure.

FIG. 3 is a schematic view of at least a portion of an example implementation of a drill string hoisting system 300 operable to support and lift individual tubulars 111 and a drill string 120 according to one or more aspects of the present disclosure. The drill string hoisting system 300 may form a portion of or operate in conjunction with the well construction system 100 shown in FIG. 1 and be operable to perform at least a portion of the processes described above in association with FIG. 1. The drill string hoisting system 300 may, thus, comprise one or more features of the well construction system 100, including where indicated by the same numerals. The drill string hoisting system 300 may be monitored and controlled by the control system 200 shown in FIG. 2. Accordingly, the following description refers to FIGS. 1-3, collectively.

The drill string hoisting system 300 may comprise a top drive 116 supported by a traveling block 113 operatively connected with and collectively raised by a lifting device, such as a draw works 118 via a support line 123. The traveling block 113 may comprise a sheave 303 connected to a connection block 305 and reeved to the stationary block 115 via the support line 123. The top drive 116 may be coupled with the travelling block 113 via a plurality (e.g., two, four) of top drive tie rods or links 308 extending between the connection block 305 and the top drive 116. The support line 123 may be stored on a storage reel 310 and tied down by a deadline anchor 312. The support line 123 may also or instead be stored on a spool 314 of the draw works 118. An elevator 129 configured to couple with a box end of a single tubular 111 or an upper end (i.e., box end) of the drill string 120 may be connected with the top drive 116 via elevator links 127. As described above, a motor or another rotary actuator (not shown) of the draw works 118 may be operated by a processing device, such as the processing device 202, to rotate the spool 314 to wind or unwind the support line 123 to lift or lower the top drive 116 and, thus, the individual tubulars 111 or drill string 120 during tubular running and drilling operations.

The drill string hoisting system 300 may comprise a plurality of sensors 302, 304, 306 each operable to generate sensor signals or information that may be indicative of or operable to facilitate determination of sensor measurements of operational parameters of equipment associated with the sensors 302, 304, 306. For example, the drill string hoisting system 300 may comprise a plurality of acceleration sensors 304 (e.g., strain gauge accelerometers, piezoelectric vibration sensors, etc.), each operable to generate a sensor signal indicative of or operable to facilitate determination of acceleration measurement of the drill string 120. The acceleration sensors 304 may be disposed or installed in association with, for example, the travelling block 113, the top drive links 308, the top drive 116, the elevator links 127, and/or the elevator 129. One or more sensors of the sensor package 186 of the downhole tool 180 may be or comprise an acceleration sensor 304.

The drill string hoisting system 300 may further comprise one or more rotational position sensors 306, each operable to generate a sensor signal indicative of or operable to facilitate determination of rotational position measurements of the spool 314 of the draw works 118. The rotational position sensors 306 may be disposed or installed in association with, for example, the motor or a rotational shaft of the draw works 118. The rotational position measurements may be indicative of block position, which may be or comprise position of a traveling block 113 or another portion of the drill string hoisting system 300 (e.g., top drive 116) supported by the traveling block 113. The rotational position measurements may be further indicative of rotational speed of the spool 314 and, thus, linear speed of the traveling block 113 and of the drill string 120. The rotational position measurements may be also be indicative of rotational acceleration of the spool 314 and, thus, linear acceleration of the traveling block 113 and of the drill string 120. The sensors 306 may be or comprise, for example, encoders, rotary potentiometers, and rotary variable-differential transformers (RVDTs). Accordingly, when the draw works 118 is operated to lift or otherwise move the travelling block 113 and the drill string 120, such as during tubular running and drilling operations, one or more of the acceleration sensors 304 and/or rotational position sensors 306 may each generate a sensor signal or information indicative of or operable to facilitate determination of acceleration measurement of the drill string 120.

The drill string hoisting system 300 may further comprise a plurality of weight sensors 302, each operable to generate a sensor signal or information indicative of or operable to facilitate determination of weight measurement of the drill string 120 supported by the drill string hoisting system 300. The weight sensors 302 may be disposed or installed in association with the top drive links 308, the elevator links 127, the deadline anchor 312, and/or other portions of the drill string hoisting system 300. Each weight sensor 302 may be or comprise a load sensor (e.g., a load cell, a strain gauge, etc.) operable to generate a sensor signal indicative of or operable to facilitate determination of tension measurement and, thus, weight measurement of members supported by the support line 123, the links 308, and/or the elevator links 127. Thus, when the draw works 118 is operated to lift or otherwise move the drill string 120, such as during tubular running and drilling operations, weight measurement of the drill string 120 may be determined. The weight measurement of the drill string 120 may be or comprise the hook load of the hoisting system 300 determined based on weight measurements facilitated by one or more of the weight sensors 302. The weight measurement of the drill string 120 determined based on the weight sensors 302 may be referred to as a "detected weight measurement," as such weight measurement was actually detected (i.e., sensed) based on weight sensor signals generated by the weight sensors 302.

A processing device, such as the processing device 202, may be operated or caused to generate or otherwise output a movement control command (i.e., signal) to the draw works 118 of the drill string hoisting system 300 to lift or otherwise cause the drill string 120 to move in accordance to the movement control command. During wellsite operations, while each movement control command is outputted and the drill string hoisting system 300 moves the drill string 120, the processing device may receive and record to a database the outputted movement control commands and the detected position measurements, weight measurements, and/or acceleration measurements.

Figure 4:
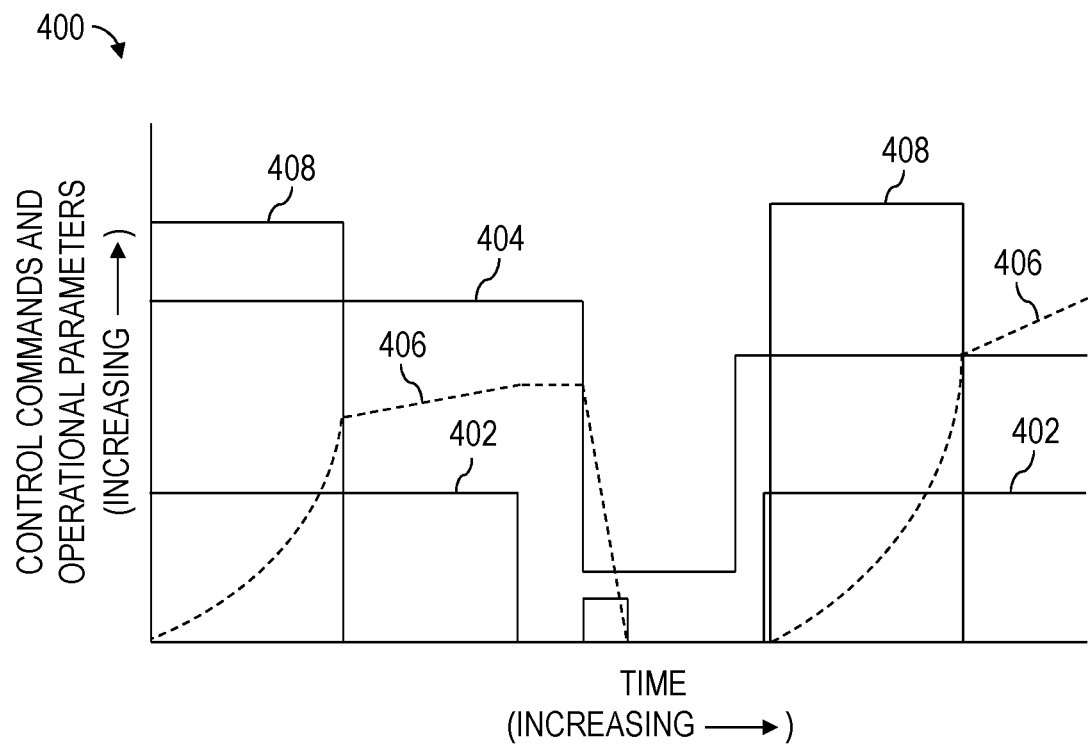
FIGS. 4-6 are graphs related to one or more aspects of the present disclosure.

FIG. 4 is a graph 400 showing example profiles of several control commands and operational parameters, including movement control commands 402 and sensor measurements 404, 406, 408 generated by corresponding sensors disposed in association with one or more pieces of the drill string hoisting system 300 shown in FIG. 3. The movement control commands 402 and sensor measurements 404, 406, 408 are plotted along the vertical axis, with respect to time, which is plotted along the horizontal axis.

The sensor measurements 404 may be or comprise detected weight measurements 404, the sensor measurements 406 may be or comprise block position (e.g., traveling block 113 position, top drive 116 position, etc.) measurements 406 (shown in dashed lines for clarity), and the sensor measurements 408 may be or comprise drill string acceleration measurements 408. The movement control commands 402 and sensor measurements 404, 406, 408 shown in graph 400 correspond to a period of time during drill string break out operations during which the drill string 120 is disassembled. The profile of the movement control commands 402 indicate that the processing device outputted the movement control commands 402, thereby causing the draw works 118 to lift the travelling block 113 and the drill string 120, then to lower the traveling block 113 after the uppermost tubular 111 of the drill string 120 is disconnected, and then to lift the travelling block 113 and the drill string 120 again after the drill string 120 is connected with the elevator 129. The detected weight measurements 404 indicate a decrease in the weight of the drill string 120 after the uppermost tubular 111 is disconnected from the drill string 120. The block position measurements 406 indicate a progressive upward movement of the travelling block 113 and the drill string 120, no movement of the drill string 120 when the uppermost tubular 111 of the drill string 120 is being disconnected, and downward movement of the travelling block 113 after the uppermost tubular 111 is disconnected. The drill string acceleration measurements 408 indicate an upward accelerations of the drill string 120 for a period of time when the draw works 118 is commanded to operate via the movement control command 402 until the speed of the drill string 120 reaches steady state, at which time no acceleration is detected. As can be seen in graph 400, the later one of the acceleration measurements 408 is greater as the weight of the drill string decreases and the later of the movement control commands 402 remains the same.

During wellsite operations, while each movement control command 402 is outputted and the drill string hoisting system 300 moves the drill string 120, the processing device may receive and record to a database the outputted movement control commands 402, the detected weight measurements 404, the position measurements 406, and the acceleration measurements 408 in association with each other. The database may thus comprise the outputted movement control commands, the detected weight measurements recorded at a time when (or before) each movement control command was outputted, and the acceleration measurements recorded when the drill string was accelerating after each movement control command was outputted. Such movement control commands, detected weight measurements, and acceleration measurements correspond with one another and, thus, may be recorded in or as part of the database in association with each other. The processing device may record the outputted movement control commands 402 and sensor measurements 404, 406, 408 for a predetermined period of time, for a plurality of jobs, and/or from different drill rigs to form a database of outputted movement control commands 404 and corresponding sensor measurements 404, 406, 408.

The movement control commands 402 outputted by the processing device to the draw works 118 and/or other portions of the drill string hoisting system 300 may cause the drill string 120 to be moved up and/or down in a predetermined manner while the acceleration response of the drill string 120 is measured. The movement control commands 402 may cause the drill string 120 to be moved in small or large displacements, at small or large speeds, and/or at small or large accelerations. The movement control commands 402 may comprise a standard move control command (e.g., causing a ramp up or ramp down of the drill string 120) that is part of an existing rig activity or operation (e.g., drilling, tripping) or a special move control command (e.g., causing intermittent movements of the drill string 120) that is embedded in an existing rig activity or operation. The movement control commands 402 may comprise a special move control command (e.g., causing alternating or random movements of the drill string 120) that is not part of an existing rig activity or operation and whose sole purpose is to determine the weight of the drill string 120. Because the movement control commands 402 are inputted to the draw works 118 and/or other portions of the drill string hoisting system 300, the movement control commands 402 may also or instead be referred to as movement control inputs.

After a database of outputted movement control commands 404 and corresponding sensor measurements 404, 406, 408 is created, a processing device may periodically, continually, and/or in real-time during current wellsite operations compare or otherwise analyze the recorded movement control commands 404 and drill string acceleration measurements 408 to deduce or otherwise indirectly determine a current weight measurement of the drill string 120 based on a current movement control command 404 and acceleration measurement 408, without receiving or otherwise utilizing a current detected weight measurement 404. The weight measurement of the drill string 120 determined based on the current movement control command 404 and acceleration measurement 408 may be referred to as a "deduced weight measurement," as such weight measurement was deduced or indirectly determined based on current and recorded movement control commands 404 and acceleration measurements 408. For example, the processing device may determine a deduced weight measurement of the downhole drill string 120 by searching the database for a recorded movement control command 402 and a corresponding recorded acceleration measurement 408 that are closest to a current movement control command 402 and a corresponding current acceleration measurement 408, and then choosing the deduced weight measurement to be equal to the recorded weight measurement associated with the closest found recorded movement control command 402 and corresponding recorded acceleration measurement 408.

Figure 5:
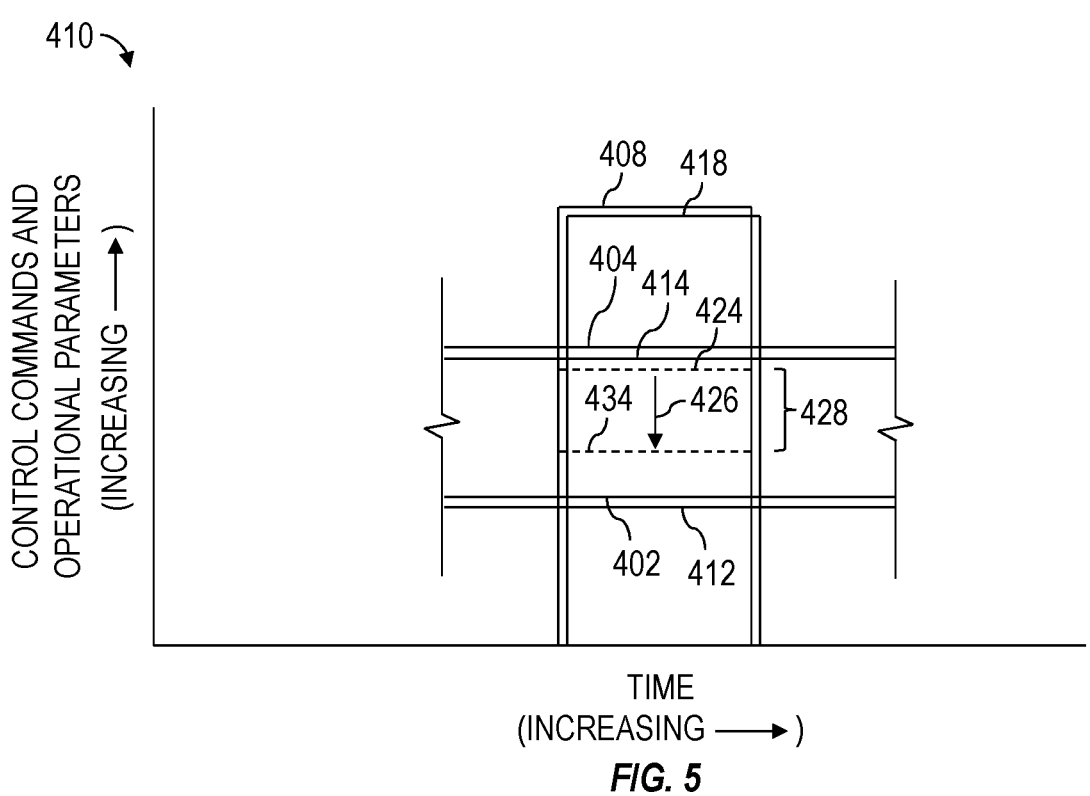

FIG. 5 is a graph 410 showing portions of example profiles of several current and recorded control commands and operational parameters, including of control commands and operational profiles shown in FIG. 4, including where indicated by the same numerals. The control commands and acceleration measurements are plotted along the vertical axis, with respect to time, which is plotted along the horizontal axis. The graph 410 shows current and recorded movement control commands 402, 412, respectively, and current and recorded acceleration measurements 408, 418, respectively, generated by corresponding sensors disposed in association with one or more pieces of the drill string hoisting system 300 shown in FIG. 3. Accordingly, the following description refers to FIGS. 3-5, collectively.

The recorded movement control commands 412 and the corresponding recorded acceleration measurements 418 are the same or substantially similar to the current movement control commands 402 and the corresponding current acceleration measurements 408, respectively. A deduced weight measurement 424 (shown in dashed lines for clarity) may therefore be deduced (e.g., inferred, predicted) and, thus, chosen to be equal to a recorded detected weight measurement 414 corresponding to the closest recorded movement control command 412 and corresponding recorded acceleration measurement 418. Accordingly, a current weight of the drill string 120 may be deduced based on the current acceleration measurement 408 facilitated by the acceleration sensors 304 and/or position sensors 306 and the current movement control command 402, when analyzed in the context of recorded acceleration measurements 418 and recorded movement control commands 412, and without relying on or utilizing the weight sensors 302 and the current detected weight measurement 404.

A processing device, such as the processing device 202, may be further operable to receive, record, and/or compare or otherwise analyze the detected and deduced weight measurements 404, 424 periodically, continually, and/or in real-time during wellsite or other operations. For example, the processing device may compare the detected and deduced weight measurements 404, 424 with each other. The processing device may then determine accuracy of the detected and deduced weight measurements 404, 424 based on such comparison. For example, if the detected and deduced weight measurements 404, 424 are substantially similar or match each other, then the detected and deduced weight measurements 404, 424 and the corresponding weight and acceleration sensors 302, 304 (and/or the rotational position sensors 306, if utilized) may be deemed or otherwise determined as being accurate, and thus validated. However, if one or both of the detected and deduced weight measurements 404, 424 suddenly or progressively change (e.g., the deduced weight measurement 424 shifts, as indicated by arrow 426) resulting in detected and deduced weight measurements 404, 434 that are appreciably different, not substantially similar, or otherwise do not substantially match, then at least one of the detected and deduced weight measurements 404, 434 and the corresponding weight and acceleration sensors 302, 304 (and/or the rotational position sensors 306, if utilized) may be deemed or otherwise determined as being inaccurate, and thus not valid. The sensor measurements 404, 434 may be determined as being inaccurate, for example, when a difference 428 (e.g., in profile and/or magnitude) between the detected and deduced weight measurements 404, 434 is equal to or greater than a predetermined threshold amount or is otherwise appreciable. Each of the corresponding weight and acceleration sensors 302, 304 (and/or the rotational position sensors 306, if utilized) and/or corresponding pieces of equipment may then be checked to determine which of the weight and acceleration sensors 302, 304 is inaccurate or if another problem associated with the corresponding equipment is causing the difference 428 between the detected and deduced weight measurements 404, 434.

Figure 6:
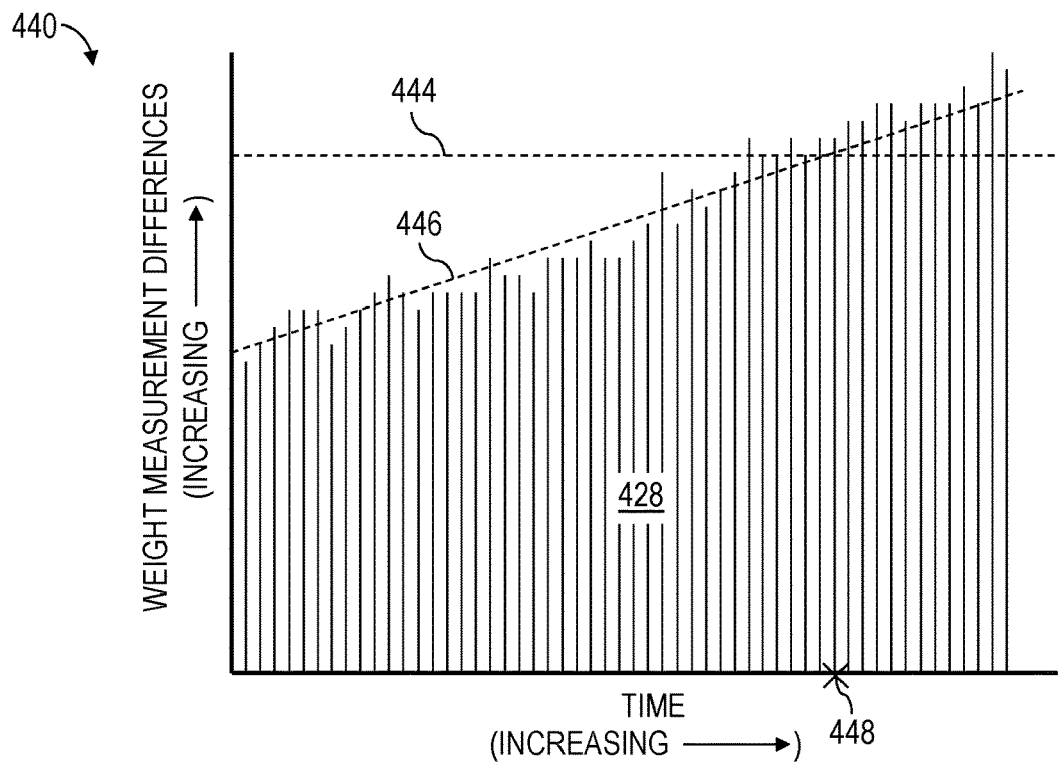

FIG. 6 is a graph 440 showing a plurality weight measurement differences 428, as described above and shown in FIG. 5, recorded over time. The graph 440 shows that the differences 428 are progressively increasing, which may indicate that the accuracy (i.e., quality) of one or both of the detected and deduced weight measurements 404, 434, shown in FIG. 4, is progressively decreasing. Such trend may be indicative of declining condition (i.e., health) of corresponding one or more of the weight and acceleration sensors 302, 304, shown in FIG. 3. The graph 440 may be generated by a processing device, such as the processing device 202, shown in FIG. 2, based on recorded historical and current operational parameter differences 428.

The processing device may generate or otherwise output condition information indicative of the health of the corresponding one or more of the weight and acceleration sensors 302, 304 (and/or the rotational position sensors 306, if utilized) based on the measurement differences 428. For example, the processing device may output information indicative of which sensor 302, 304 and/or equipment comprises a problem. The processing device may also or instead output condition information indicative of remaining life of the corresponding one or more of the sensors 302, 304. Furthermore, a threshold of acceptable condition, indicated by line 444, may be set. Accordingly, if a predetermined number of consecutive measurement differences 428 meet or exceed the threshold 444, such as at time 448, the processing device may at such time 448 output condition information suggesting or mandating that calibration or other maintenance of the corresponding one or more sensors 302, 304 and/or corresponding pieces of equipment be performed. Furthermore, if a running average of the measurement differences 428, indicated by line 446, meets or exceeds the threshold 444, such as at time 448, the processing device may at such time 448 output condition information suggesting or mandating that calibration or other maintenance of the corresponding one or more of the sensors 302, 304 (and/or the rotational position sensors 306, if utilized) and/or corresponding pieces of equipment be performed.

Thus, when the processing device does not detect measurement differences 428 over a predetermined period of time, the processing device may determine that the detected and deduced weight measurements 404, 434 and, thus, one or more of the sensors 302, 304 utilized as a basis for the measurements 404, 434 are accurate. However, when the processing device detects sudden or progressive onset of measurement differences 428 (e.g., sensor drift), the processing device may determine that the detected and deduced weight measurements 404, 434 and, thus, one or more of the sensors 302, 304 utilized as a basis for the measurements 404, 434 are inaccurate. The inaccurate detected and deduced weight measurements 404, 434 may be disregarded until the inaccurate sensors 302, 304 are replaced or recalibrated. The inaccurate detected and deduced weight measurements 404, 434 may also or instead be compensated by a predetermined value, such as by the detected difference 428 until the inaccurate sensors 302, 304 are replaced or recalibrated.

A processing device, such as the processing device 202 and/or another rig control system, may include logic that decides when to execute and/or record functions related to drill string weight measurements and validation. For example, the processing device may run sensor validation functions as part of a manual or automated diagnostics routine. Such routine can be a standard part of rig readiness (e.g. each time the rig is rigged up) and/or be performed during specific times (e.g. each time a new BHA is rigged down). The processing device may also or instead run sensor validation functions on a scheduled basis at pre-determined time intervals. For example, the processing device may be set to run validation on a time domain (e.g. every two days) or on an activity domain (e.g. every 1000 feet of run pipe). The processing device may also or instead run sensor validation functions triggered by predetermined events. For example, every time a load exceeds a threshold amount.

The output of sensor validation analysis may trigger an action related to rig operational workflows, such as a further sensor review, investigation, or maintenance and/or sensor replacement. The output of the sensor validation analysis can also or instead trigger functional modes that affect rig workflows. For example, determination of a faulty sensor can trigger events, such as stop operations of the rig, operate the rig under safe-mode conditions, diminished performance, or diminished capacity, change priority and/or timing of maintenance activities, and/or communicate to rig crew(s) actions to be performed. Determination of a correct sensor (or a sensor operating within acceptable limits) can trigger events, such as continue operations of the rig, postpone maintenance activities, and/or operate the rig under increased performance and/or capacity.

Although the processing devices and/or control systems within the scope of the present disclosure are utilized to deduce weight measurements of a drill string comprising a plurality of individual tubulars, it is to be understood that the same or similar operations and processes as described above may be utilized to deduce weight measurements of other tool strings, such as comprising a plurality of individual tubulars, but not comprising a drill bit. It is to be further understood that the same or similar operations and processes as described above may also be utilized to deduce weight measurements of other drill or tool strings (e.g., drill or tool strings deployed via coiled tubing or wireline) and/or determine accuracy of sensor measurements of other tool string hoisting systems (e.g., pipe injectors, coiled tubing injectors, wireline winch systems).

Figure 7:
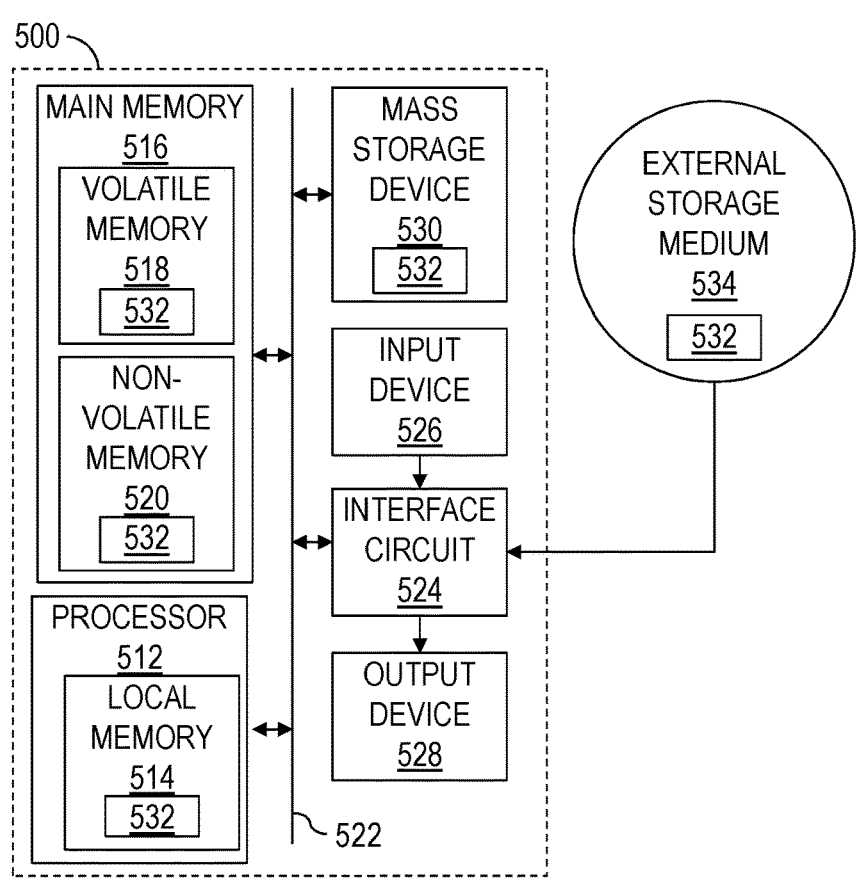
FIG. 7 is a schematic view of at least a portion of an example implementation of apparatus according to one or more aspects of the present disclosure.

FIG. 7 is a schematic view of at least a portion of an example implementation of a processing system 500 (or device) according to one or more aspects of the present disclosure. The processing system 500 may be or form at least a portion of one or more processing devices, equipment controllers, and/or other electronic devices shown in one or more of the FIGS. 1-6. Accordingly, the following description refers to FIGS. 1-7, collectively.

The processing system 500 may be or comprise, for example, one or more processors, controllers, special-purpose computing devices, PCs (e.g., desktop, laptop, and/or tablet computers), personal digital assistants, smartphones, IPCs, PLCs, servers, internet appliances, and/or other types of computing devices. The processing system 500 may be or form at least a portion of the processing device 192, 202. The processing system 500 may be or form at least a portion of the local controllers 221-226. Although it is possible that the entirety of the processing system 500 is implemented within one device, it is also contemplated that one or more components or functions of the processing system 500 may be implemented across multiple devices, some or an entirety of which may be at the wellsite and/or remote from the wellsite.

The processing system 500 may comprise a processor 512, such as a general-purpose programmable processor. The processor 512 may comprise a local memory 514, and may execute machine-readable and executable program code instructions 532 (i.e., computer program code) present in the local memory 514 and/or another memory device. The processor 512 may execute, among other things, the program code instructions 532 and/or other instructions and/or programs to implement the example methods and/or operations described herein. For example, the program code instructions 532, when executed by the processor 512 of the processing system 500, may cause the processor 512 to receive, record, and process (e.g., compare) sensor data (e.g., sensor measurements), deduce sensor data, and output data and/or information indicative of accuracy the sensor data and, thus, the corresponding sensors. The program code instructions 532, when executed by the processor 512 of the processing system 500, may also or instead cause one or more portions or pieces of wellsite equipment of a well construction system and/or drill string hoisting system to perform the example methods and/or operations described herein. The processor 512 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Examples of the processor 512 include one or more INTEL microprocessors, microcontrollers from the ARM and/or PICO families of microcontrollers, embedded soft/hard processors in one or more FPGAs.

The processor 512 may be in communication with a main memory 516, such as may include a volatile memory 518 and a non-volatile memory 520, perhaps via a bus 522 and/or other communication means. The volatile memory 518 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 520 may be, comprise, or be implemented by read-only memory, flash memory, and/or other types of memory devices. One or more memory controllers (not shown) may control access to the volatile memory 518 and/or non-volatile memory 520.

The processing system 500 may also comprise an interface circuit 524, which is in communication with the processor 512, such as via the bus 522. The interface circuit 524 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 524 may comprise a graphics driver card. The interface circuit 524 may comprise a communication device, such as a modem or network interface card to facilitate exchange of data with external computing devices via a network (e.g., Ethernet connection, digital subscriber line (DSL), telephone line, coaxial cable, cellular telephone system, satellite, etc.).

The processing system 500 may be in communication with various sensors, video cameras, actuators, processing devices, equipment controllers, and other devices of the well construction system via the interface circuit 524. The interface circuit 524 can facilitate communications between the processing system 500 and one or more devices by utilizing one or more communication protocols, such as an Ethernet-based network protocol (such as ProfiNET, OPC, OPC/UA, Modbus TCP/IP, EtherCAT, UDP multicast, Siemens S7 communication, or the like), a proprietary communication protocol, and/or another communication protocol.

One or more input devices 526 may also be connected to the interface circuit 524. The input devices 526 may permit human wellsite operators 195 to enter the program code instructions 532, which may be or comprise control commands, operational parameters, and/or operational setpoints. The program code instructions 732 may further comprise modeling or predictive routines, equations, algorithms, processes, applications, and/or other programs operable to perform example methods and/or operations described herein. The input devices 526 may be, comprise, or be implemented by a keyboard, a mouse, a joystick, a touchscreen, a track-pad, a trackball, an isopoint, and/or a voice recognition system, among other examples. One or more output devices 528 may also be connected to the interface circuit 524. The output devices 528 may permit for visualization or other sensory perception of various data, such as sensor data, status data, and/or other example data. The output devices 528 may be, comprise, or be implemented by video output devices (e.g., an LCD, an LED display, a CRT display, a touchscreen, etc.), printers, and/or speakers, among other examples. The one or more input devices 526 and the one or more output devices 528 connected to the interface circuit 524 may, at least in part, facilitate the HMIs described herein.

The processing system 500 may comprise a mass storage device 530 for storing data and program code instructions 532. The mass storage device 530 may be connected to the processor 512, such as via the bus 522. The mass storage device 530 may be or comprise a tangible, non-transitory storage medium, such as a floppy disk drive, a hard disk drive, a compact disk (CD) drive, and/or digital versatile disk (DVD) drive, among other examples. The processing system 500 may be communicatively connected with an external storage medium 534 via the interface circuit 524. The external storage medium 534 may be or comprise a removable storage medium (e.g., a CD or DVD), such as may be operable to store data and program code instructions 532.

As described above, the program code instructions 532 and other data (e.g., sensor data or measurements) may be stored in the mass storage device 530, the main memory 516, the local memory 514, and/or the removable storage medium 534. Thus, the processing system 500 may be implemented in accordance with hardware (perhaps implemented in one or more chips including an integrated circuit, such as an ASIC), or may be implemented as software or firmware for execution by the processor 512. In the case of firmware or software, the implementation may be provided as a computer program product including a non-transitory, computer-readable medium or storage structure embodying computer program code instructions 532 (i.e., software or firmware) thereon for execution by the processor 512. The program code instructions 732 may include program instructions or computer program code that, when executed by the processor 712, may perform and/or cause performance of example methods, processes, and/or operations described herein.

In view of the entirety of the present disclosure, including the figures and the claims, a person having ordinary skill in the art will readily recognize that the present disclosure introduces a system comprising: (A) an acceleration sensor disposed in association with a piece of equipment at an oil and gas wellsite, wherein the acceleration sensor is operable to facilitate determination of an acceleration measurement of a downhole tool string; and (B) a processing device comprising a processor and a memory storing computer program code, wherein the processing device is operable to: (1) output a movement control command to a lifting device to cause the downhole tool string to move in accordance to the movement control command; (2) receive the acceleration measurement; and (3) determine a weight measurement of the downhole tool string based on the movement control command and the acceleration measurement.

The processing device may be operable to determine the weight measurement of the downhole tool string based further on a database of corresponding past movement control commands, past weight measurements, and past acceleration measurements.

The weight measurement may be a deduced weight measurement, the piece of equipment may be a first piece of equipment, the system may further comprise a weight sensor disposed in association with a second piece of equipment, the weight sensor may be operable to facilitate determination of a detected weight measurement of the downhole tool string, and the processing device may be further operable to: (A) receive the detected weight measurements; (B) record a database of the movement control commands in association with corresponding detected weight measurements and acceleration measurements; and (C) determine the deduced weight measurement of the downhole tool string by (1) searching the database for a recorded movement control command and corresponding recorded acceleration measurement that are closest to current movement control command and corresponding current acceleration measurement, and (2) determining the deduced weight measurement to be equal to a recorded detected weight measurement corresponding to the closest recorded movement control command and corresponding recorded acceleration measurement.

The processing device may be operable to determine the weight measurement of the downhole tool string while the tool string is moved during wellsite operations.

The piece of equipment may comprise at least one of a draw works, a travelling block, a top drive, an elevator, and a drill string.

The downhole tool string may be or comprise a downhole drill string.

The weight measurement may be a deduced weight measurement, the piece of equipment may be a first piece of equipment, the system may further comprises a weight sensor disposed in association with a second piece of equipment, the weight sensor may be operable to facilitate determination of a detected weight measurement of the downhole tool string, and the processing device may be further operable to: receive the detected weight measurement; compare the deduced weight measurement to the detected weight measurement; and determine accuracy of at least one of the acceleration sensor and weight sensor based on the comparison. The processing device may be operable to determine the accuracy of at least one of the acceleration sensor and weight sensor based on the comparison while the first and second pieces of equipment are performing actions as part of a well site operation. Comparing the deduced weight measurement to the detected weight measurement may comprise determining a difference between the deduced weight measurement and detected weight measurement. Determining the accuracy of at least one of the acceleration sensor and weight sensor may comprise determining that the acceleration sensor and weight sensor are accurate when the deduced weight measurement and detected weight measurement are substantially equal to each other. Determining the accuracy of at least one of the acceleration sensor and weight sensor may comprise determining that at least one of the acceleration sensor and weight sensor is inaccurate when the deduced weight measurement and detected weight measurement are appreciably different. Determining the accuracy of at least one of the acceleration sensor and weight sensor may comprise determining that at least one of the acceleration sensor and weight sensor is inaccurate when a difference between the deduced weight measurement and detected weight measurement is equal to or greater than a predetermined threshold quantity. The first piece of equipment may comprise at least one of a draw works, a travelling block, a top drive, an elevator, and a drill string, and the second piece of equipment may comprise at least one of a top drive, a top drive link, an elevator link, and a deadline anchor. The detected weight measurement may be facilitated by the weight sensor.

The movement control command outputted by the processing device to the lifting device may comprise one or more of: a standard movement control command that is part of an existing rig operation; a special movement control command that is embedded in an existing rig operation; and a special movement control command that is not part of an existing rig operation and whose sole purpose is to determine the weight measurement of the downhole tool string.

The present disclosure also introduces a method comprising commencing operation of a processing device to control operations at an oil and gas wellsite, wherein the processing device: outputs a movement control command to a lifting device to cause a downhole tool string to move in accordance to the movement control command; receives an acceleration measurement of the downhole tool string; and determines a weight measurement of the downhole tool string based on the movement control command and the acceleration measurement.

The processing device may determine the weight measurement of the downhole tool string based further on a database of corresponding past outputted movement control commands, past weight measurements, and past acceleration measurements.

The weight measurement may be a deduced weight measurement, and the processing device may further: (A) receive a detected weight measurement of the downhole tool string facilitated by a weight sensor; (B) record a database of the outputted movement control commands in association with corresponding detected weight measurements and acceleration measurements; and (C) determine the deduced weight measurement of the downhole tool string by (1) searching the database for a recorded movement control command and corresponding recorded acceleration measurement that are closest to current movement control command and corresponding current acceleration measurement, and (2) determining the deduced weight measurement to be equal to the recorded detected weight measurement associated with the closest recorded movement control command and recorded acceleration measurement.

The piece of equipment may comprise at least one of a draw works, a travelling block, a top drive, an elevator, and a drill string.

The downhole tool string may be or comprise a downhole drill string.

The acceleration measurement may be facilitated by an acceleration sensor, the weight measurement may be a deduced weight measurement, and the processing device may further: receive a detected weight measurement of the downhole tool string facilitated by a weight sensor; compare the deduced weight measurement to the detected weight measurement; and determine accuracy of at least one of the acceleration sensor and weight sensor based on the comparison. The acceleration sensor may be disposed in association with a first piece of equipment, the weight sensor may be disposed in association with a second piece of equipment, and the processing device may further determines the accuracy of at least one of the acceleration sensor and weight sensor based on the comparison while the first and second pieces of equipment are performing actions as part of a well site operation. Comparing the deduced weight measurement to the detected weight measurement may comprise determining a difference between the deduced weight measurement and detected weight measurement. Determining the accuracy of at least one of the acceleration sensor and weight sensor may comprise determining that the acceleration sensor and weight sensor are accurate when the deduced weight measurement and detected weight measurement are substantially equal to each other. Determining the accuracy of at least one of the acceleration sensor and weight sensor may comprise determining that at least one of the acceleration sensor and weight sensor is inaccurate when the deduced weight measurement and detected weight measurement are appreciably different. Determining the accuracy of at least one of the acceleration sensor and weight sensor may comprise determining that at least one of the acceleration sensor and weight sensor is inaccurate when a difference between the deduced weight measurement and detected weight measurement is equal to or greater than a predetermined threshold quantity. The acceleration sensor may be disposed in association with at least one of a travelling block, a top drive, a top drive link, an elevator, and a drill string, and the weight sensor may be disposed in association with at least one of a travelling block, a crown block, a top drive, a top drive link, an elevator, and a deadline anchor. The detected weight measurement may be facilitated by the weight sensor.

The movement control command outputted by the processing device to the lifting device may comprise one or more of: a standard movement control command that is part of an existing rig operation; a special movement control command that is embedded in an existing rig operation; and a special movement control command that is not part of an existing rig operation and whose sole purpose is to determine the weight measurement of the downhole tool string.

The present disclosure also introduces a method comprising commencing operation of a processing device to control operations at an oil and gas wellsite, wherein the processing device: outputs a current movement control command to a lifting device to cause a downhole tool string to move; receives a current acceleration measurement of the downhole tool string; compares the current movement control command and the current acceleration measurement to recorded past movement control commands and corresponding recorded past acceleration measurements; and determines a current weight measurement of the tool string to be equal to a recorded past weight measurement associated with closest recorded movement control command and corresponding recorded acceleration measurement.

Comparing the current movement control command and the current acceleration measurement to the recorded past movement control commands and the corresponding recorded past acceleration measurements may comprise searching the recorded past movement control commands and corresponding recorded past acceleration measurements for recorded past movement control commands and corresponding recorded past acceleration measurements that are closest to the current movement control command and the current acceleration measurement.

The current acceleration measurement may be facilitated by an acceleration sensor disposed in association with at least one of a draw works, a travelling block, a top drive, an elevator, and a drill string.

The downhole tool string may be or comprise a downhole drill string.

The current acceleration measurement may be facilitated by an acceleration sensor, the current weight measurement may be a current deduced weight measurement, and the processing device may further: receive a current detected weight measurement of the downhole tool string facilitated by a weight sensor; compare the current deduced weight measurement to the current detected weight measurement; and determine accuracy of at least one of the acceleration sensor and weight sensor based on the comparison. The acceleration sensor may be disposed in association with a first piece of equipment, the weight sensor may be disposed in association with a second piece of equipment, and the processing device may further determine the accuracy of at least one of the acceleration sensor and weight sensor based on the comparison while the first and second pieces of equipment are performing actions as part of a wellsite operation. Comparing the current deduced weight measurement to the current detected weight measurement may comprise determining a difference between the current deduced weight measurement and current detected weight measurement. Determining the accuracy of at least one of the acceleration sensor and weight sensor may comprise determining that the acceleration sensor and weight sensor are accurate when the current deduced weight measurement and current detected weight measurement are substantially equal to each other. Determining the accuracy of at least one of the acceleration sensor and weight sensor may comprise determining that at least one of the acceleration sensor and weight sensor is inaccurate when the current deduced weight measurement and current detected weight measurement are appreciably different. Determining the accuracy of at least one of the acceleration sensor and weight sensor may comprise determining that at least one of the acceleration sensor and weight sensor is inaccurate when a difference between the current deduced weight measurement and current detected weight measurement is equal to or greater than a predetermined threshold quantity. The acceleration sensor may be disposed in association with at least one of a travelling block, a top drive, a top drive link, an elevator, and a drill string, and the weight sensor may be disposed in association with at least one of a travelling block, a crown block, a top drive, a top drive link, an elevator, and a deadline anchor. The detected weight measurement may be facilitated by the weight sensor.

The movement control command outputted by the processing device to the lifting device may comprise one or more of: a standard movement control command that is part of an existing rig operation; a special movement control command that is embedded in an existing rig operation; and a special movement control command that is not part of an existing rig operation and whose sole purpose is to determine the weight measurement of the downhole tool string.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. A system comprising:
    an acceleration sensor disposed in association with a first piece of equipment at an oil and gas wellsite, wherein the acceleration sensor is operable to facilitate determination of an acceleration measurement of a downhole tool string;
    a weight sensor disposed in association with a second piece of equipment, the weight sensor operable to facilitate determination of a detected weight measurement of the downhole tool string; and
    a processing device comprising a processor and a memory storing computer program code, wherein the processing device is operable to:
        output a movement control command to a lifting device to cause the downhole tool string to move in accordance to the movement control command;
        receive the acceleration measurement; and
        determine a deduced weight measurement of the downhole tool string based on the movement control command and the acceleration measurement;
        receive the detected weight measurement;
        compare the deduced weight measurement to the detected weight measurement; and
        determine an accuracy of at least one of the acceleration sensor and the weight sensor based on the comparison.

2. The system of claim 1 wherein the processing device is operable to determine the deduced weight measurement of the downhole tool string further based on a database of corresponding past movement control commands, past weight measurements, and past acceleration measurements.

3. The system of claim 1 wherein the first piece of equipment comprises at least one of a draw works, a travelling block, a top drive, an elevator, and a drill string.

4. The system of claim 1 wherein:
    the processing device is further operable to:
        receive a plurality of past movement control commands output to the lifting device;
        receive a plurality of past acceleration measurements from the acceleration sensor;
        receive a plurality of past detected weight measurements from the weight sensor;
        record, in a database, each past movement control command of the plurality of past movement control commands in association with a respective corresponding past detected weight measurement of the plurality of past detected weight measurements and a respective corresponding past acceleration measurement of the plurality of past acceleration measurements; and determine the deduced weight measurement of the downhole tool string by:

searching the database for a closest past movement control command of the plurality of past movement control commands and the respective corresponding past acceleration measurement that are closest to the movement control command and the acceleration measurement; and determining the deduced weight measurement to be equal to the respective corresponding past detected weight measurement that is recorded in association with the closest past movement control command and the respective corresponding past acceleration measurement.

5. The system of claim 1 wherein the first piece of equipment comprises at least one of a draw works, a travelling block, a top drive, an elevator, and a drill string, and wherein the second piece of equipment comprises at least one of a top drive, a top drive link, an elevator link, and a deadline anchor.

6. The system of claim 1 wherein the movement control command outputted by the processing device to the lifting device comprises one or more of:

a standard movement control command that is part of an existing rig operation;

a special movement control command that is embedded in an existing rig operation; or a special movement control command that is not part of an existing rig operation and whose sole purpose is to determine the deduced weight measurement of the downhole tool string.

7. The system of claim 1 wherein the processing device is further operable to determine the deduced weight measurement of the downhole tool string by:

accessing, from a database, a plurality of past movement control commands, a plurality of past acceleration measurements, and a plurality of past weight measurements;

identifying a past movement control command of the plurality of past movement control commands and a corresponding past acceleration measurement of the plurality of past acceleration measurements that are closest to the movement control command and the acceleration measurement; and determining the weight measurement based on a corresponding past weight measurement of the plurality of past weight measurements that is stored in association with the past movement control command and the corresponding past acceleration measurement.

8. A method comprising:

commencing operation of a processing device to control operations at an oil and gas wellsite, wherein the processing device:

outputs a movement control command to a lifting device to cause a downhole tool string to move in accordance to the movement control command;

receives an acceleration measurement of the downhole tool string facilitated ban an acceleration sensor;

determines a deduced weight measurement of the downhole tool string based on the movement control command and the acceleration measurement;

receives a detected weight measurement of the downhole tool string facilitated by a weight sensor;

compares the deduced weight measurement to the detected weight measurement; and determines an accuracy of at least one of the acceleration sensor and the weight sensor based on the comparison.

9. The method of claim 8 wherein the processing device determines the deduced weight measurement of the downhole tool string further based on a database of corresponding past outputted movement control commands, past weight measurements, and past acceleration measurements.

10. The method of claim 8 wherein the processing device further:

receives a plurality of past movement control commands output to the lifting device;

receives a plurality of past acceleration measurements;

receives a plurality of past detected weight measurements of the downhole tool string facilitated by the weight sensor;

records, in a database, each past movement control command of the plurality of past movement control commands in association with a respective corresponding past detected weight measurement of the plurality of past detected weight measurements and a respective corresponding past acceleration measurement of the plurality of past acceleration measurements; and determines the deduced weight measurement of the downhole tool string by:

searching the database for a closest past movement control command of the plurality of past movement control commands and the respective corresponding past acceleration measurement that are closest to the movement control command and the acceleration measurement; and determining the deduced weight measurement to be equal to the respective corresponding past detected weight measurement that is recorded in association with the closest past movement control command and the respective corresponding past acceleration measurement.

11. The method of claim 8 wherein the acceleration sensor is disposed in association with a first piece of equipment, wherein the weight sensor is disposed in association with a second piece of equipment, and wherein the processing device further determines the accuracy of at least one of the acceleration sensor and the weight sensor based on the comparison while the first and second pieces of equipment are performing actions as part of a wellsite operation.

12. The method of claim 8 wherein determining the accuracy of at least one of the acceleration sensor and the weight sensor comprises determining that the acceleration sensor and the weight sensor are accurate when the deduced weight measurement and the detected weight measurement are substantially equal to each other.

13. A method comprising:

commencing operation of a processing device to control operations at an oil and gas wellsite, wherein the processing device:

outputs a current movement control command to a lifting device to cause a downhole tool string to move;

receives a current acceleration measurement of the downhole tool string;

compares the current movement control command and the current acceleration measurement to recorded past movement control commands and corresponding recorded past acceleration measurements; and determines a current weight measurement of the downhole tool string to be equal to a recorded past weight measurement associated with a closest recorded past movement control command of the recorded past movement control commands and corresponding recorded past acceleration measurement of the corresponding recorded past acceleration measurements.

14. The method of claim 13 wherein comparing the current movement control command and the current acceleration measurement to the recorded past movement control commands and the corresponding recorded past acceleration measurements comprises searching the recorded past movement control commands and the corresponding recorded past acceleration measurements for the closest recorded past movement control command and corresponding recorded past acceleration measurement that are closest to the current movement control command and the current acceleration measurement.

15. The method of claim 13 wherein the current acceleration measurement is facilitated by an acceleration sensor disposed in association with at least one of a draw works, a travelling block, a top drive, an elevator, and a drill string.

16. The method of claim 13 wherein the current acceleration measurement is facilitated by an acceleration sensor, wherein the current weight measurement is a current deduced weight measurement, and wherein the processing device further:

receives a current detected weight measurement of the downhole tool string facilitated by a weight sensor;

compares the current deduced weight measurement to the current detected weight measurement; and determines an accuracy of at least one of the acceleration sensor and the weight sensor based on the comparison.

17. The method of claim 16 wherein the acceleration sensor is disposed in association with a first piece of equipment, wherein the weight sensor is disposed in association with a second piece of equipment, and wherein the processing device further determines the accuracy of at least one of the acceleration sensor and the weight sensor based on the comparison while the first and second pieces of equipment are performing actions as part of a wellsite operation.

18. The method of claim 16 wherein determining the accuracy of at least one of the acceleration sensor and the weight sensor comprises determining that the acceleration sensor and the weight sensor are accurate when the current deduced weight measurement and the current detected weight measurement are substantially equal to each other.

* * * * *